United States Patent

Regula

(10) Patent No.: US 6,851,009 B1
(45) Date of Patent: Feb. 1, 2005

(54) METHOD, SYSTEM AND APPARATUS FOR A COMPUTER SUBSYSTEM INTERCONNECTION USING A CHAIN OF BUS REPEATERS

(75) Inventor: Jack Regula, San Jose, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 0 days.

(21) Appl. No.: 10/446,402

(22) Filed: May 28, 2003

Related U.S. Application Data

(63) Continuation of application No. 09/315,412, filed on May 19, 1999, now Pat. No. 6,581,126, which is a continuation-in-part of application No. 08/771,581, filed on Dec. 20, 1996, now Pat. No. 6,091,705.
(60) Provisional application No. 60/116,686, filed on Jan. 20, 1999.

(51) Int. Cl.[7] .......................... G06F 13/14; H04L 12/28
(52) U.S. Cl. .................... 710/305; 710/31; 370/392; 711/141
(58) Field of Search ................. 710/305, 31, 36–38; 370/351, 392; 709/238, 239, 242; 711/140–146

(56) References Cited

U.S. PATENT DOCUMENTS

| | | | |
|---|---|---|---|
| 4,866,706 A | | 9/1989 | Christophersen et al. |
| 5,410,723 A | | 4/1995 | Schmidt et al. |
| 5,524,234 A | * | 6/1996 | Martinez et al. ............ 711/141 |
| 5,551,048 A | * | 8/1996 | Steely, Jr. ................... 707/201 |
| 5,764,924 A | | 6/1998 | Hong |
| 5,841,989 A | * | 11/1998 | James et al. ................ 709/239 |
| 5,895,496 A | * | 4/1999 | James et al. ................ 711/163 |
| 5,920,267 A | | 7/1999 | Tattersall et al. |
| 6,058,447 A | * | 5/2000 | Holst et al. ................. 710/105 |
| 6,091,705 A | | 7/2000 | Regula |
| 6,122,285 A | * | 9/2000 | Okada ......................... 370/450 |
| 6,212,161 B1 | | 4/2001 | Regula |
| 6,253,292 B1 | * | 6/2001 | Jhang et al. ................ 711/146 |
| 6,400,682 B1 | | 6/2002 | Regula |
| 6,581,126 B1 | | 6/2003 | Regula |
| 6,631,448 B2 | * | 10/2003 | Weber ......................... 711/141 |

OTHER PUBLICATIONS

Arunkumar et al. "Efficient Broadcast Using Selective Flooding." INFOCOM '92. Eleventh Annual Joint Conference of the IEEE Computer and Communications Societies. IEEE, May 4–8, 1992, pp. 2060–2067 vol. 3.

\* cited by examiner

*Primary Examiner*—Sumati Lefkowitz
*Assistant Examiner*—Trisha Vu
(74) *Attorney, Agent, or Firm*—Swernofsky Law Group PC

(57) ABSTRACT

The invention discloses methods and apparatus for broadcasting information across an interconnect that includes a plurality of nodes each connected to its adjacent node(s) using one or more links. The nodes can emit cells containing transaction sub-actions onto the links. As a node receives a cell the node retransmits the cell onto other links as the cell is being received. Thus, reducing the latency imposed by the node. The node also captures the transaction sub-action while it the cell is retransmitted. The node responds to the transaction sub-action by manipulating shared handshake lines that are bussed with the other nodes. The invention enables snooping cache protocols to be successfully used in a larger multi-processor computer system than the prior art.

14 Claims, 12 Drawing Sheets

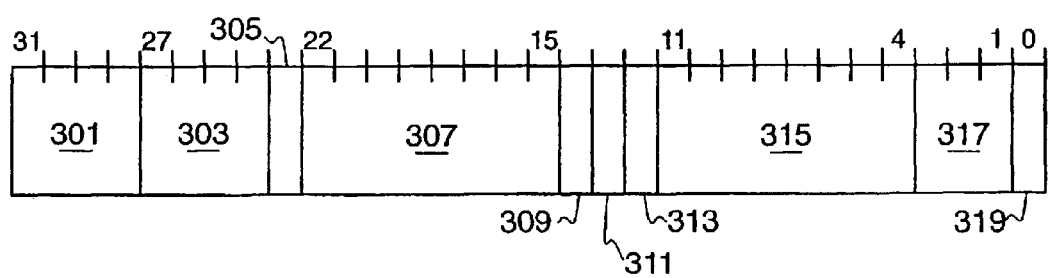
| 201 | Control |
| 203 | Control* |
| 205 | Address[63:32] |
| 207 | Address[31:0] |
| 209 | Data_0[63:32] |
| 211 | Data_0[31:0] |
| 213 | Data Words |
| 215 | Data_n[63:32] |
| 217 | Data_n[31:0] |
200 Fig. 2
300 Fig. 3

METHOD, SYSTEM AND APPARATUS FOR A COMPUTER SUBSYSTEM INTERCONNECTION USING A CHAIN OF BUS REPEATERS

This application is a continuation of U.S. application Ser. No. 09/315,412, Method, System and Apparatus for a Computer Subsystem Interconnection Using a Chain of Bus Repeaters, filed May 19, 1999, now U.S. Pat. No. 6,581,126, hereby incorporated in its entirety, which is a continuation-in-part of U.S. application Ser. No. 08/771,581, Method and Apparatus for a Fault Tolerant, Software Transparent and High Data Integrity Extension to a Backplane Bus or Interconnect, filed Dec. 20, 1996, now U.S. Pat. No. 6,091, 705, and hereby incorporated by reference in its entirety; this application also claims priority from U.S. Provisional Application 60/116,686, Broken Ring, filed Jan. 20, 1999, and hereby incorporated by reference in its entirety.

BACKGROUND OF THE INVENTION

1. Field of the Invention

This invention relates to the field of computer busses.

2. Background

A major issue in the information age is the speed at which data can be transferred between points. This issue exists in computers both for transferring data between memory and a central processing unit, and for transferring data between devices and/or memory. The issue also exists for transferring data between computers or digitized voice data between telephone units.

As processor speed and network traffic has increased, the physical limitations of traditional interconnects have become more apparent. With commonly available home computers operating at a clock speed of more than 500 MHz, the computing bottleneck is generally a result of moving data within the system and not as a result of processing the data. Rambuss technology is one approach that addresses a similar problem in providing a high bandwidth interconnection between a processor and memory. Other approaches exist for generalized high speed interconnects such as the scaleable coherent interface (SCI).

One problem is that vast amounts of data need to be transported from one place to another as quickly as possible with minimal latency and maximum throughput.

Another problem in the known art is within multiple processor systems that require copies of the same data in multiple caches. Existing cache-coherency protocols on single-bus multiprocessor systems are limited by the physics of the single bus. That is some of the desirable bus characteristics are incompatible: high bandwidth, low latency, and unlimited length. Thus, increasing the number of processors accessing the bus increases the memory/processor traffic, increases the time required to arbitrate the bus, and physically lengthens the bus (thus decreasing the maximum rate at which it can be clocked, and therefore decreasing the bus' bandwidth).

Single bus multiprocessor systems generally use snooping protocols to maintain cache coherency. The caches on these systems monitor "snoop" bus transactions from other caches to determine whether the transaction affects the cache's contents (effectively, each bus transaction is broadcast to every cache). Replacing the single bus with a point-to-point interconnection to avoid the single bus limitations also removes the broadcast mechanism that is used by the snooping protocols. Thus, the snooping protocols have been considered as not economically feasible for large multiprocessor designs.

It would be advantageous to provide a high speed, highly pipelined, interconnect between one or more processors, caches and memories that supports multi-gigahertz clock rates and four or more times the number of cache agents as is currently supported by known system busses that snoop bus transactions.

SUMMARY OF THE INVENTION

The invention discloses methods and apparatus for broadcasting information across an interconnect that includes a plurality of nodes each connected to its adjacent node(s) using one or more links. The nodes can emit cells containing transaction sub-actions onto the links. As a node receives a cell the node retransmits the cell onto other links as the cell is being received. Thus, reducing the latency imposed by the node. The node also captures the transaction sub-action while it retransmits the cell. The node responds to the transaction sub-action by manipulating shared handshake lines that are bussed with the other nodes. The invention enables snooping cache protocols to be successfully used in a larger multi-processor computer system than the prior art.

The foregoing and many other aspects of the present invention will no doubt become obvious to those of ordinary skill in the art after having read the following detailed description of the preferred embodiments that are illustrated in the various drawing figures.

DESCRIPTION OF THE DRAWINGS

FIG. 2 illustrates a cell in accordance with a preferred embodiment;

FIG. 3 illustrates the format of a control word used with the cell of FIG. 2;

DESCRIPTION OF THE PREFERRED EMBODIMENTS

Notations and Nomenclature

The following "notations and nomenclature" are provided to assist in understanding the present invention and the preferred embodiments thereof.

Capturing—All cells passing through a node are captured into buffers identified by a tag value within the cell. The node examines the cell's transaction sub-action to determine what actions, if any, the node is required to perform with regard to it.

Cell—The terms "cell" and "packet" mean the same for this application. A cell contains either system control information or a transaction sub-action. One or more transaction sub-actions constitute a complete transaction that effectuates a computer sub-system data transfer.

Emitting—The process of sending signals onto a link. A cell is transmitted onto a link by emitting the cell's data onto the link.

Swallowing—A node swallows a cell if the node captures the cell without forwarding the cell. The end-nodes of the bus swallow all cells. If the end-node receives a granting cell, the grant may be reflected (re-transmitted in the opposite direction) in a new cell.

Transmitted—A cell is transmitted over a link by emitting the data that makes up the cell onto the link.

Background

The maximum speed of high-speed repeater bus architectures is limited by clock and signal jitter, skew, and device setup and hold margins. If the data clock is sent over the bus with the data signals, clock jitter increases as the repeater bus adds repeaters and eventually clock jitter limits the number of possible repeaters in the repeater bus.

One approach to this problem is to provide a timing reference signal that is used by each repeater to generate its own internal clock and to use a delay lock loop (DLL) to synchronize the clock edges with the data signals. However, this approach is still subject to skew between the clock and each of the data path signals. By using the de-skewing regenerative repeater node technology described in the parent application, a very high-speed repeater node can be used in a high-speed repeater bus architecture.

One use of such a high speed repeater bus architecture is to support snooping cache protocols. Such an architecture enables snooping cache protocols to be used with larger multiprocessor systems than has been previously practical.

DETAILED DESCRIPTION OF THE PREFERRED EMBODIMENTS

The invention includes a method, apparatus, and system for building a very high speed, repeater data bus. The subsequent description is of a preferred high-speed embodiment. Lower speed embodiments may not use all of the subsequently described techniques.

Figure 4:
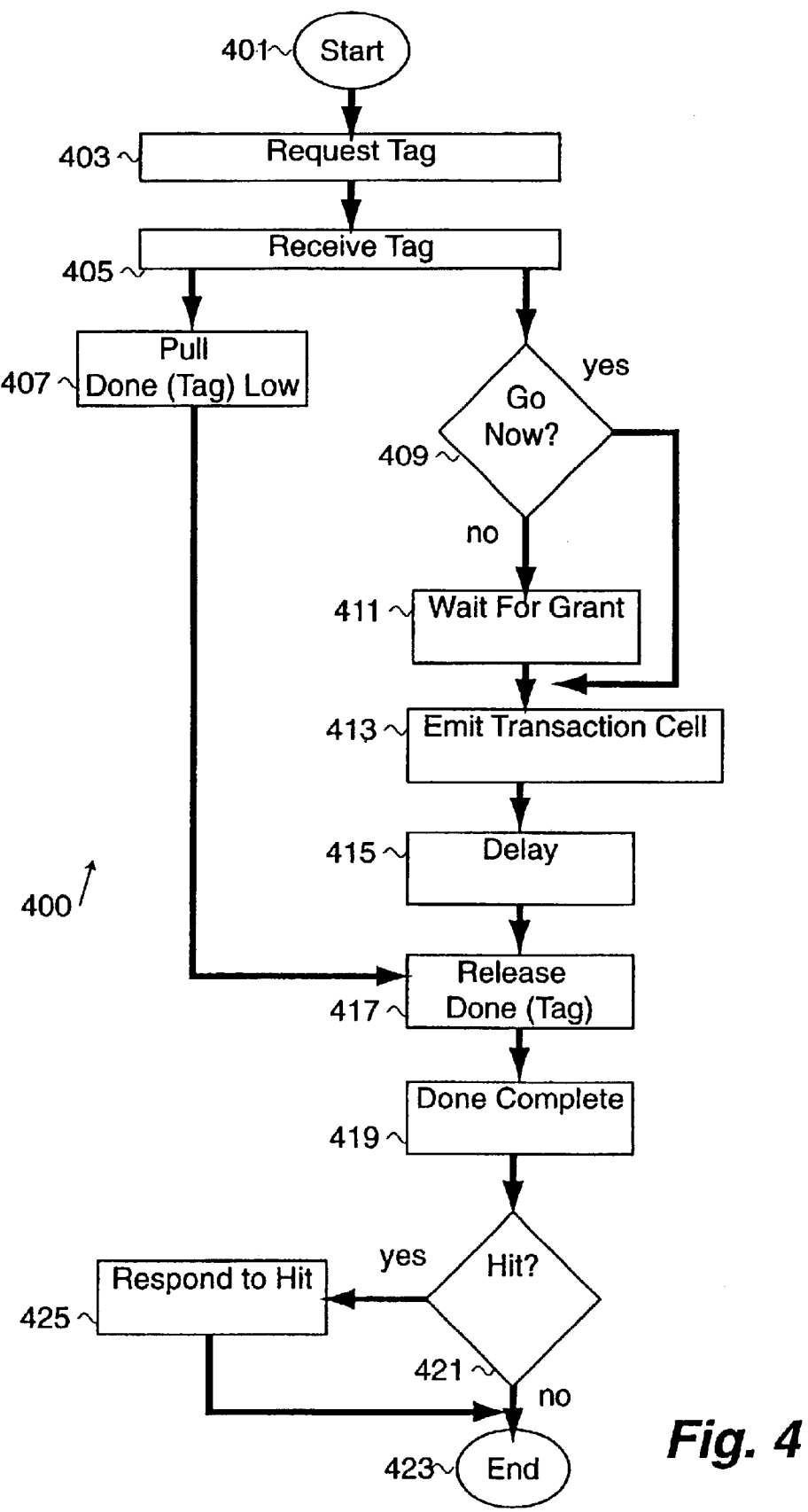
FIG. 4 illustrates a transaction sub-action process in accordance with a preferred embodiment.

FIG. 4 and the associated text of the incorporated parent application describe techniques that can be used for receiving source-synchronous data signals by delaying the data signals so that these signals can be clocked by a receiving node's clock of the same frequency but different phase from the source node's clock.

FIG. 5a and the associated text of the incorporated parent application describe the logic that can be used to generate the inphase and quadrature clock signals that are used to clock the delayed data signals.

FIG. 5b and the associated text of the incorporated parent application describe the logic that can be used to train the input data delay lines (DDLs).

Figure 6:
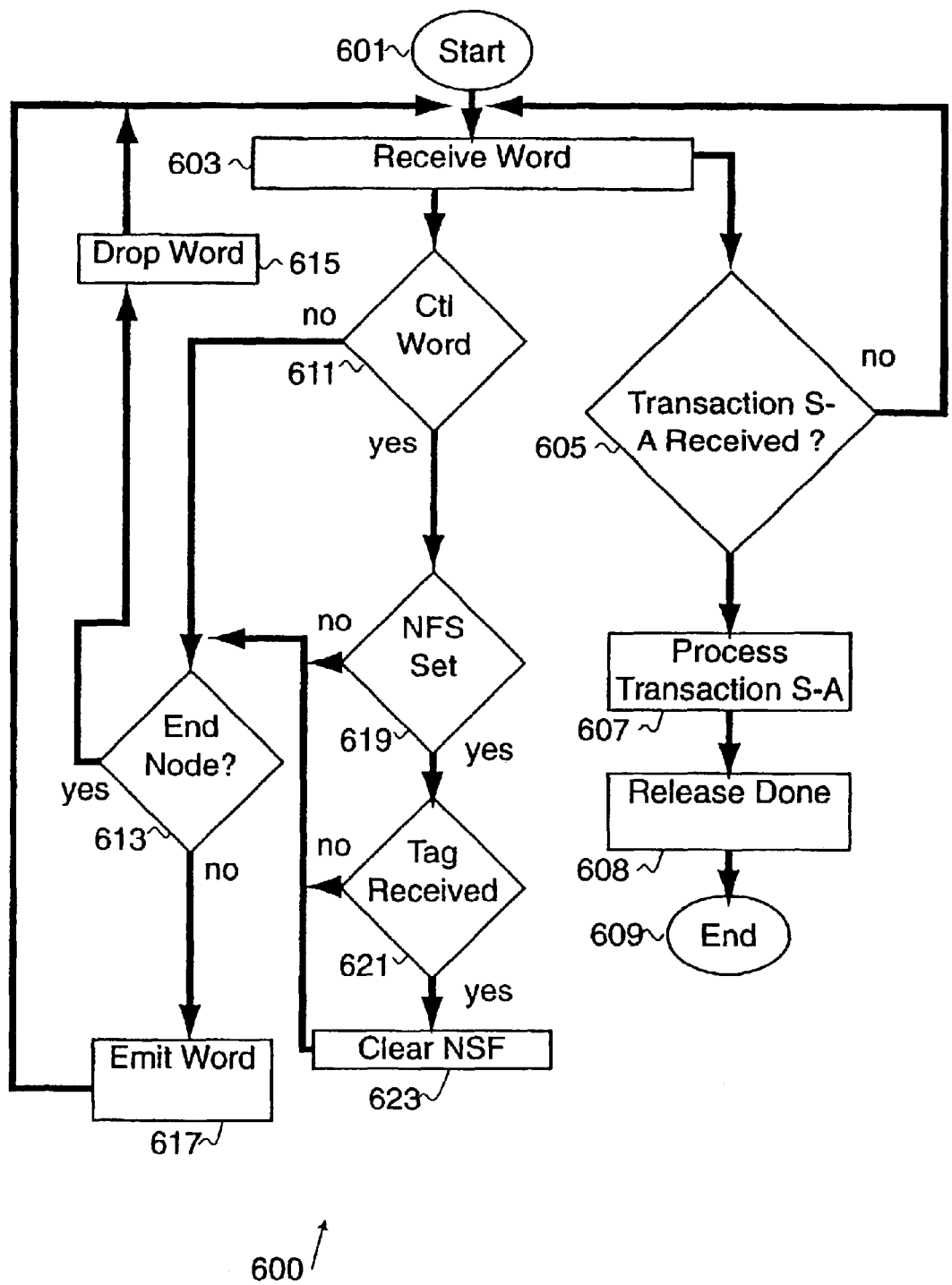
FIG. 6 illustrates a cell handling process in accordance with a preferred embodiment.

FIG. 6 and the associated text of the incorporated parent application describe the logic to delay any given data signal.

FIG. 19a and the associated text of the incorporated parent application describe the logic used to regenerate a cell onto an outgoing link as the cell is being received at an incoming link.

FIG. 19b and the associated text of the incorporated parent application describe the timing for the signals processed by logic illustrated in FIG. 19a. The techniques disclosed by the parent application with regard to uni-directional links can be used by one skilled in the art to regenerate data cells onto bi-directional links with very low latency.

The above descriptions in the parent application explained how data flows from one node to another and how the data transfer is synchronized and clocked between nodes. For the instant invention, each end of the links must be trained to adjust the signal delays. This is accomplished by sending training signals that contain known data patterns across the interconnect when the interconnect is being initialized. This training process is subsequently described with respect to FIG. 10.

Chain of Repeaters

One aspect of the invention transmits cells containing transaction sub-actions over the interconnect. A node originating a transaction sub-action emits the cell containing the information required to complete the transaction sub-action over point to point links to each of its two neighbor nodes. Each neighbor node forwards the cell in the same direction to its own neighbor node. This process continues until the cell eventually reaches all the nodes in the chain (as the cells emitted from the originating node each propagate to their respective end nodes). The broadcast mechanism required for snooping cache coherence protocols has been retained despite the use of point to point links which permit a significantly higher clock rate than possible on a bus.

Multiprocessor Cache Coherency

The invention can be used with snooping cache protocols in either a ring or a broken-ring interconnect (in a ring interconnect the invention operates as a broken ring by moving the point at which the ring is broken to coincide with the point at which one or more modules have been removed from the ring-thus, the ring can be configured to accommodate "hot swap" capabilities). One aspect of the invention transmits cells containing transaction sub-actions onto the interconnect. Each node that receives a cell emits the cell onto a link to the next node (possibly adding another cell after retransmission), performs snooping protocol operations or other operations, and signals when the operation is complete through a set of shared handshake signal lines associated with multiple identified buffers at the nodes. High-speed retransmission of the cell is performed using the techniques described in the parent application. In particular, the incoming signals at each node can be delayed so that they are synchronous with the clock of the receiving node. One preferred embodiment forwards the node clock along with the data, avoiding the need for delay lines. Another preferred embodiment uses a single delay for all the incoming signal lines. Another preferred embodiment uses a separate delay for each incoming signal line. For these latter embodiments, training signals can be periodically transmitted along the interconnect to keep the delay lines trained.

When used for snooping cache protocols, the multiple buffers and handshake signal lines de-couple the broadcasting of an address from the subsequent snooping operation in each cache. Thus, the snooping operations are pipelined and multiple snoops can occur substantially in parallel. Each buffer and associated handshake signal line group is identified by a tag value. The tag value is included in all cells on the interconnect and is used to route such cells to the appropriate temporary buffer at each node. The result and completion of a tagged snooping operation is indicated using the handshake signal lines dedicated to its tag.

Figure 1A:
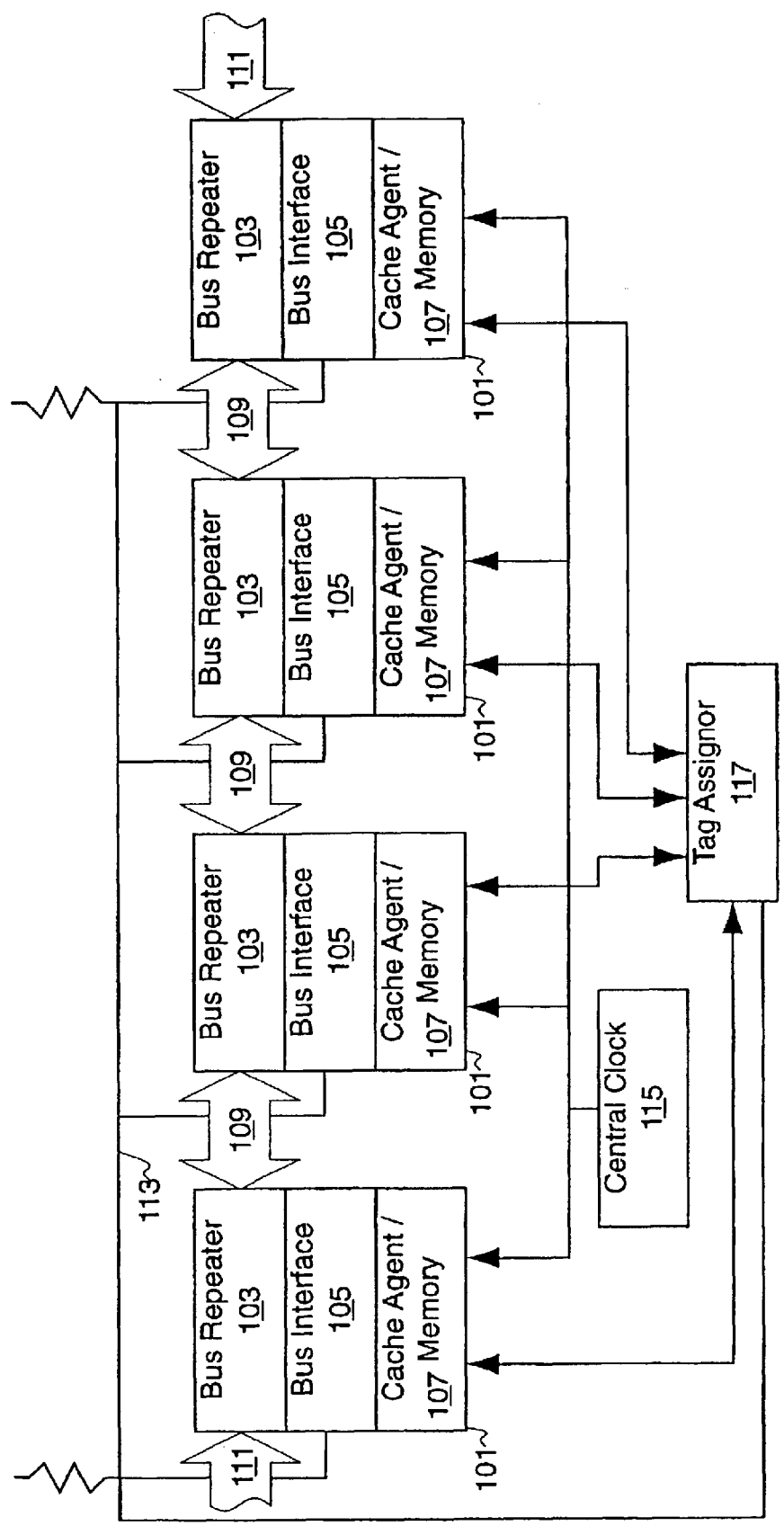
FIG. 1A illustrates an interconnect architecture in accordance with a preferred embodiment.

FIG. 1A illustrates an interconnect architecture, indicated by general reference character 100, that can use snooping cache protocols. These and other protocols can be used to transmit information across the interconnect. The interconnect architecture 100 includes a plurality of nodes 101 each of which contains a bus repeater 103, a bus interface 105, and an agent 107. The agent 107 can be (without limitation) a cache agent, a non-caching agent (such as a DMA controller), and/or a memory. The nodes 101 are connected to one or more connecting links 109 by the bus repeater 103. An ending link 111 can be used by its attached nodes such that the ending link 111 has the same function as the one or more connecting links 109 in a ring network, as an open connection that terminates one end of the interconnect architecture 100, or as a connecting link that is configured to be an end link (such that if some other connecting link fails, this end link can be configured as a connecting link and so provide fault tolerance capability to the interconnect architecture 100). The interconnect architecture 100 also includes a set of three-party handshake signal line groups 113 (such as wired-OR lines). The nodes 101 can be connected to a central clock 115 that generates a reference frequency signal used by the nodes 101 to generate the node clock as has been described in the parent application. Other clocking techniques can be used. In particular, the node clock can be propagated across the link or by a separate clock line, or the node clock can be generated within the node with respect to a frequency reference signal propagated across the link or provided by a separate frequency reference line. A tag assignor 117 is in communication with the nodes 101 and is in communication with the set of three-party handshake signal line groups 113. In one preferred embodiment, the links 109, 111 are bi-directional links. In another embodiment, the links 109, 111 include two unidirectional paths.

The bus repeater 103 can clock the data signals by using a bussed signal clock, a system clock reference (or bussed frequency reference) with a phase locked loop clock generator and a delay to synchronize the incoming data signals with the generated clock, or a system clock reference (or bussed frequency reference) with a phase locked loop clock generator and delays to synchronize each of the incoming data signals with the generated clock.

The tag assignor 117 receives a request from the agent 107 and returns a tag value. The tag value is associated with a buffer in the agent 107 (and corresponding buffers in the other nodes) and one set of the set of three-party handshake signal line groups 113 (which are subsequently described with respect to FIG. 1B). The tag assignor 117 is analogous to that of an arbiter in a conventional bussed interconnect. However, the tag assignor 117 does not assign the tag value unless the set of three-party handshake signal line groups 113 indicate that the buffer associated with the tag value is not already in use. In a preferred embodiment, the tag assignor 117 can concurrently assign multiple tag values if presented with multiple requests and if multiple unused tag values are available. Thus, the operation of the tag assignor 117 is independent of the number of nodes requesting tag values at a given time so long as tag values are available. Unlike a bus arbiter that can only issue one grant at a time, the tag assignor 117 concurrently satisfies requests for tag values and thus reduces the grant delay as compared to a bus arbiter.

Figure 1B:
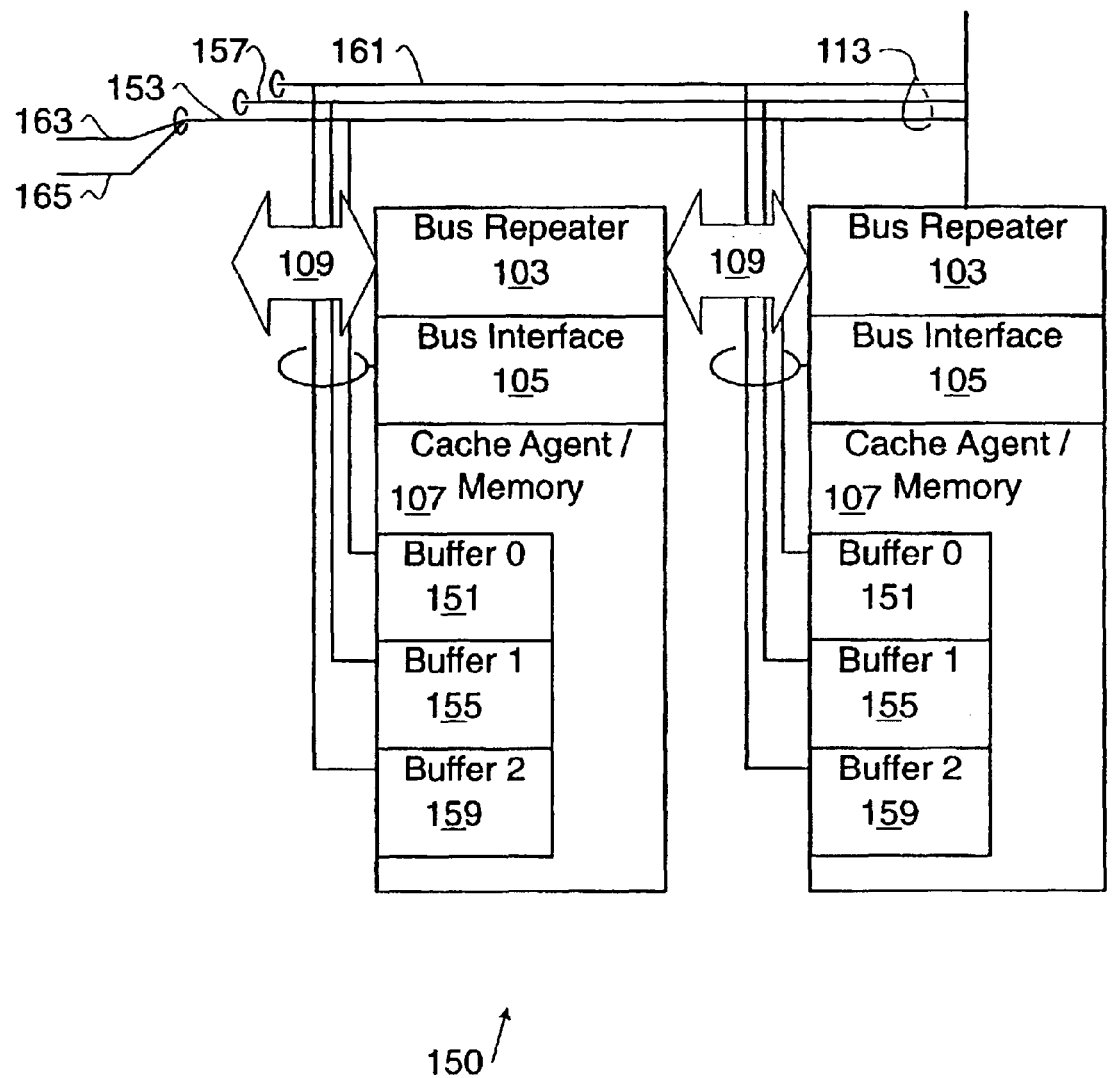
FIG. 1B details cache buffers and associated handshake lines of the interconnect architecture of FIG. 1A.

FIG. 1B illustrates a handshake/buffer association, indicated by general reference character 150, used to associate a handshake line set and a buffer in each of the nodes 101 with the tag value. The agent 107 contains a buffer for each possible tag value. Thus, a buffer (0) 151 and a handshake (0) line set 153 are both associated with tag value 0, a buffer (1) 155 and a handshake (1) line set 157 are both associated with tag value 1, and a buffer (2) 159 and a handshake (2) line set 161 are both associated with tag value 2. Each of the handshake line groups includes at least two lines. For example, the handshake (0) line set 153 contains a DONE (0) signal line 163 and a HIT* (0) signal line 165.

Figure 1C:
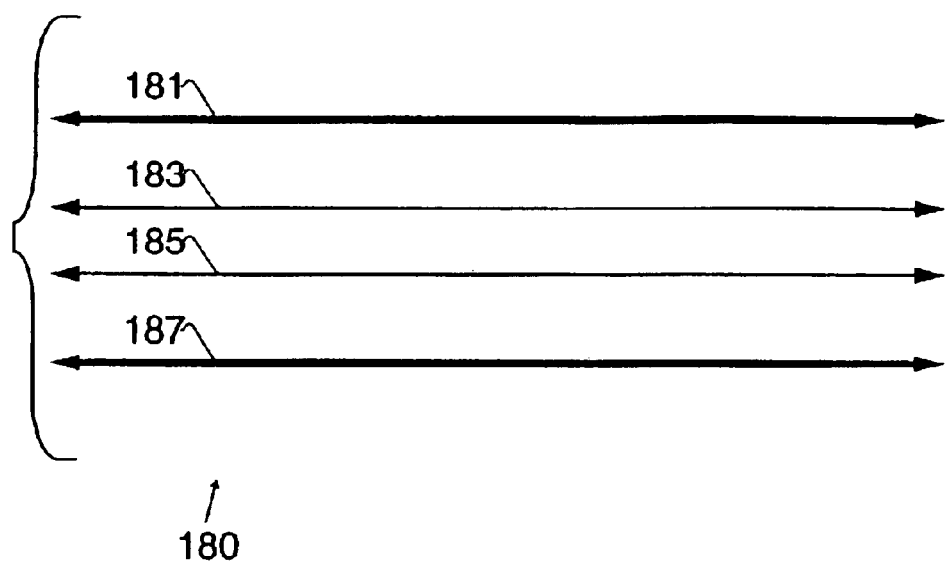
FIG. 1C details the signal lines in the bi-directional link used in FIG. 1A and FIG. 1B.

FIG. 1C illustrates a bi-directional link, indicated by general reference character 180, used to carry signals between adjacent pairs of the nodes 101. The bi-directional link 180 includes address, data and control signal lines (ADC) 181 that carry the signals that have been emitted onto the bi-directional link 180 that make up a cell. A cell can contain data, address or control information. In a preferred embodiment, the ADC 181 is 32 lines wide thus carrying 32 bits of data for each transition of the node clock. Other embodiments can have more or less lines. A parity signal line 183 carries the odd parity of the data carried by the ADC 181. An active* signal line 185 carries a signal that is analogous to the cell flag signal of the parent application. The signal carried by this line delineates cell boundaries for the variable length cells used in the preferred embodiment A set of bussed handshake signal line groups 187 contain bussed handshake lines. Each handshake line set is associated with a buffer through a tag value and includes a HIT* (tag) and a DONE (tag) line. Thus for example, for nodes having 5 buffers, the set of bussed handshake signal line groups 187 would contain 5 sets of handshake line groups (each group containing a HIT* and DONE signal line).

When any of the nodes 101 receives a cell with a tag value of "0", the node stores the transaction sub-action (contained in the received information) in the buffer (0) 151 (and at the same time, retransmits the cell out the link opposite the link that received the cell (unless the node is an end node)). The node pulls down the DONE (0) signal line 163 until the operation responsive to the transaction sub-action is completed. Different conditions cause each of the nodes 101 to pull down the HIT* signal line, depending upon the transaction sub-action. For example, if the transaction sub-action is a coherent memory read request and if the associated snoop operation detected a hit and the referenced data in the cache has been modified, the node will pull down the HIT* signal line corresponding to the tag value assigned to the transaction sub-action. For this type of transaction sub-action, the HIT* signal line functions as a hit modified signal. It causes the memory to ignore the transaction sub-action because the cache agent asserting the HITS signal line thereby promises to return the data to the requestor at a later time. (It will do this by requesting a tag value and doing a Coherent Read Response transaction.).

If the transaction sub-action is a coherent read response and a cache agent, other than the original requestor, wishes to keep a copy of the data, then it pulls down the appropriate HIT* signal line before releasing the corresponding DONE signal line. In this way, a shared response is given to the other cache agents. This allows cache agents to keep a record of whether or not the information in a given cache line is shared with other cache agents. Note that while a coherent read response is made by a cache agent, the memory agent keeps a copy of the response data and updates the appropriate memory location. The memory agent does pull down the HIT* signal line when so doing.

Other types of coherent transaction sub-actions (such as invalidates) do not require a response on the HIT* signal line. These transaction sub-actions need only use the DONE signal line. Non-coherent transaction sub-actions have only a single responder. For these transaction sub-actions, non-participating nodes release the DONE signal line as soon as they decode the address. Then, the assertion of the HIT* signal line and subsequent release of the DONE signal line by the addressed node conclude the use of that particular tag and associated handshake lines and buffers for that transaction sub-action.

For example, if the snoop operation detected a hit for a transaction sub-action having the tag value of zero, the node also pulls down the HIT* (0) signal line 165 prior to the release of the DONE (0) signal line 163 by the node. Thus, each node receives the transaction sub-action, processes the transaction sub-action, indicates a node-determined condition, and signals when the transaction sub-action is completed by the node. Thus, multiple snoop transaction sub-actions can be pipelined by each node depending on the number of buffers within the agent 107. Additional details about implementing snooping cache protocols are subsequently provided with respect to FIG. 9A and FIG. 9B.

The interconnect transports cells from one node over a link to an adjacent node. The cells contain information (such as a transaction sub-action—for example, the address, data, and control information required to perform a data transfer). The cells are emitted from a source node (originating node) onto both links connected to the source node (subject to special considerations due to end nodes). Each subsequent node in turn detects the cell and propagates the cell out the link opposite to the one on which the cell arrived with a minimal delay (typically under four nanoseconds). By propagating the cell from the originating node to adjacent nodes on both sides of the originating node and by these nodes to in turn propagating the cell to their adjacent node the cell is communicated to all nodes in the interconnect FIG. 2 illustrates a cell, indicated by general reference character 200, that can be used by the invention. One skilled in the art will understand that many other formats can be used. The cell 200 includes a control word 201 (subsequently described with respect to FIG. 3), an inverted control word 203 containing the complement of the control word 201 (this option provides a signal transition that helps to keep the adjustable delay circuits in tune as was described in the parent application). An 'address [63:32]' field 205 containing the high bits of an address. An 'address [31:0]' field 207 containing the lower bits of the address. A 'data_0 [63:32]' field 209 contains the high order bits of the first data word. A 'data_0 [31:0]' field 211 contains the low order bits of the first data word. An 'additional data' field 213 contains more data. A 'data_n [63:32]' field 215 contains the high order bits of the nth data word and a 'data_n [31:0]' field 217 contains the low order bits of the $n^{th}$ data word. The number of data words is controlled by fields in the control word 201. The cell 200 can be a variable length cell. The 'address [63:32]' field 205 and the 'address [31:01' field 207 can be used to specify the address to be snooped by the cache agents. These address fields can also be used for other operations (such as specifying the starting address for the coherent read request).

FIG. 3 illustrates a control word, indicated by general reference character 300, used to specify the meaning of the cell 200 shown in FIG. 2. The control word 300 includes a 'tag [31:28]' field 301 that contains the tag value obtained from the tag assignor 117. In a preferred embodiment, the 'tag [31:28]' field 301 associates the transaction sub-action with one of up to 16 sets of buffers and handshake signals groups.

An 'agent ID [27:24]' field 303 can contain the identification of the node that initiates a read transaction sub-action.

The 'agent ID [27:24]' field 303 can also contain the identification of the target node for a read response or write-back transaction sub-action.

A 'burst [23]' field 305 determines whether the transaction sub-action is a burst or non-burst transaction sub-action. A 'byte enable [22:15]' field 307 contains information that is dependent on the 'burst [23]' field 305. If the 'burst [23]' field 305 is TRUE, the 'byte enable [22:15]' field 307 contains the number of words (n) transferred in the cell 200. If the 'burst [23]' field 305 is FALSE, the 'byte enable [22:151' field 307 contains a byte map indicating which bytes of data word 0 contains information (the 'data_0 [63:32]' field 209 and the 'data_0 [31:0]' field 211) and allowing any subset of the eight bytes to be transferred.

A 'read/write [14]' field 309 indicates whether the transaction sub-action is related to read or writes. If the command field in conjunction with the 'read/write [14]' field 309 indicates a read request transaction sub-action, the transaction sub-action is a read transaction sub-action from the specified address (notice that the data fields in the cell 200 are not included. If the command field in conjunction with the 'read/write [14]' field 309 indicated a read response, the transaction sub-action is a read response transaction sub-action and the data fields contain the requested data. One preferred embodiment is configurable to operate coherency protocols with cache lines of 32, 64, 128 or 256 bytes and is capable of transferring up to 256 bytes of data in a single burst, independent of cache line length.

A 'set cache line lock [13]' field 311 and a 'clear cache line lock [12]' field 313 are use to set and clear cache line locks as is known in the art. A 'command [11:4]' field 315 contains values that, in conjunction with the read/write bit, specify specific commands such as coherent read request, coherent read response, write, write and invalidate, invalidate, non-coherent read request, non-coherent read response, and others known in the art. A 'reserved [3:1]' field 317 contains bits that may be used for additional functionality.

A 'next slot free [0]' field 319 indicates that the current cell is the last cell in a sequence of contiguous cells being transmitted over the bus. A node that has a pending transaction sub-action, clears the 'next slot free [0' field 319 as the cell is regenerated, then emits, onto the link, the pending transaction sub-action in a cell that has the 'next slot free [1' field 319 set. Cells that have the 'next slot free [0]' field 319 set are granting cells (or grants). As is subsequently described, a non-end-originating node emits two cells containing its pending transaction sub-action. One cell is emitted in the grant direction with the grant. At substantially the same time, another cell is emitted in the non-grant direction. This is subsequently described with respect to FIG. 5 and FIG. 7.

One skilled in the art will understand that there exist many equivalents for the details of the cell 200 and the control word 300. These equivalents include different placement and size of the fields within the cell as well as the number of signal lines used, and the kinds and numbers of transactions and transaction sub-actions supported. Having discussed one possible cell format (directed towards providing cache coherence capability to the interconnect) the following discusses some of the ways that these cells can be transported and used. FIG. 4 illustrates a transaction sub-action process, indicated by general reference character 400, that illustrates the transmission of a cell containing a transaction sub-action from the originating node. This figure is directed towards a generalized transaction. Cache coherence transactions will differ in detail, but still use the fundamental techniques described with respect to the general transaction. The transaction sub-action process 400 initiates at a 'start' terminal 401 when a transaction sub-action is pending. A 'request tag' step 403 requests the tag value from the tag assignor 117. A 'receive tag' step 405 receives the tag value from the tag assignor 117 along with (in one preferred embodiment) the state of a go_now signal. A 'pull down DONE' step 407 operates concurrently with a 'go_now' decision step 409 responsive to the state of the go_now signal. The 'pull down DONE' step 407 pulls down the DONE line associated with the assigned tag value. The DONE line will be subsequently released by the originating node after the other nodes have had time to also pull down the DONE line (after sufficient time for the propagation of the cell from the originator node to all the other nodes plus the time required to recognize the transaction sub-action). As each receiving node receives the transaction sub-action, that node will also pull down the DONE line associated with the tag value assigned to the transaction sub-action. Each of the receiving nodes releases the DONE line after completing the operation related to this transaction sub-action. Thus, the appropriate DONE line rises when all nodes have completed the transaction sub-action for the tag value and, at this point, the tag value can be reassigned by the tag assignor 117). Some transaction sub-actions can be addressed to a specified node in which case, the specified node is the only node that pulls down the DONE line. Other transaction sub-actions can be broadcast to all nodes in which case each node pulls down the DONE line as the node concurrently processes the transaction sub-action (along with the other nodes) and when the last node releases the DONE line, the transaction sub-action is complete.

The 'go_now' decision step 409 determines whether the go_now signal was provided by the tag assignor 117. If the go_now signal was not asserted, the transaction sub-action process 400 continues to regenerate received cells. Eventually, a granting cell passes through the node and is detected by the node at a 'detect grant cell' step 411. A granting cell has the 'next slot free [0]' field 319 in the control word 201 of the cell set TRUE (as was previously described with respect to FIG. 3 and FIG. 2). As each word of the incoming cell is received by one side of the node, it is emitted out the other side of the node (except for end nodes). When a cell arrives with the 'next slot free [0]' field 319 TRUE (a grant), the node retransmits the cell with the 'next slot free [0]' field 319 FALSE (thus, this cell is no longer a grant). At the end of the granting cell, the node then transmits one or more of its own pending cells (containing a transaction sub-action for each cell) through each side of the node. The last cell emitted in the granting direction has the 'next slot free [0]' field 319 set to TRUE and so propagates the grant along the grant direction. A transmit condition occurs either when the node receives the grant, or when the cell has received a go_now signal. As a cell passes each active node, more cells can be added. This process is further described with respect to FIG. 5 and FIG. 7. Once the node has received the grant or the go_now, an 'emit transaction sub-action cell' step 413 emits the cell containing the transaction sub-action onto both of the node's links (assuming a non-end node). The cell emitted in the grant direction link contains the grant. The cell emitted on the other link (the non-grant direction) does not contain the grant.

After the cell is emitted onto the link(s) by the 'emit transaction sub-action cell' step 413, the transaction sub-action process 400 continues to a 'delay' step 415 that waits for all other nodes to receive the just-transmitted cell and for each to pull down the DONE signal (this is a fixed time period depending only upon the number of nodes in the chain, the position of the node in the chain, and the delay through each node (implementation dependent). Then, a 'release DONE' step 417 releases the DONE signal. Next, the transaction sub-action originator waits at a 'DONE complete' step 419 until the DONE signal raises (indicating that all the nodes have processed the transaction sub-action). At this point, the tag assignor 117 can now reuse the tag. A 'HIT*' decision step 421 examines the state of the HIT* signal line corresponding to the DONE signal line. The use of the HIT* signal line is dependent on the type of the transaction sub-action and can be used to provide appropriate status information as the success or failure of the transaction sub-action back to the originating node. For example, the appropriate HIT* signal can signal the resulting state of a transaction sub-action (such as the completion of a memory store operation of data sent in a coherent read response operation).

If the HIT* signal line is high, a hit did not occur in any of the caches in the nodes and the transaction sub-action process 400 completes through an 'end' terminal 423. However, if the HIT* signal line is low, a hit did occur in at least one of the caches in the nodes and the transaction sub-action process 400 continues to a 'respond to HIT*' step 425 that performs the appropriate response depending on the transaction (for example, to invalidate or update the cache lines). The transaction sub-action process 400 then completes through the 'end' terminal 423. Details about the operation of cache related transactions using snooping cache protocols are subsequently provided with respect to FIG. 9A and FIG. 9B.

A node that asserts the HIT* signal must keep the HIT* signal asserted past the signal rise on the corresponding DONE signal line. Nodes attempting to detect assertion of the HIT.* signal should register its assertion as soon as possible (with suitable precautions for noise immunity) rather than waiting for the signal rise on the DONE signal line to clock the HIT* signal into a register (the rise of DONE on an open-drain bus is well known to be noisy). The timing rules for this interconnect are designed to provide a minimum low assertion time for the HIT* signal that is sufficient to allow reliable detection of the low state of the HIT* signal.

If the entire interconnect is idle (that is no tag is currently in use) the go_now signal is used to improve grant latency. One preferred embodiment does not use the go_now signal. Instead, each end node reverses the grant direction upon receiving the grant and emits the grant in the new grant direction. Thus, the grant continuously reflects from one end node to the other end node such that there is always a grant active on the bus. Thus, there is usually a grant latency between the time a node receives a tag and the time the grant reaches the node.

Another preferred embodiment does not reflect the grant if the tag assignor 117 has no outstanding tags (the interconnect is idle). This embodiment uses the go_now signal to initiate a grant as soon as the tag is received by the node. Thus, the first node on an idle interconnect to receive a tag is immediately able to emit cells containing the node's pending transaction sub-action over its links (an end node only emits over one side of the node). One of the emitted cells contains the grant. This improves the grant latency for interconnects that have a sufficient number of nodes. The go_now embodiment is preferred when the arbitration/go_now issuing time delay is shorter than the reflect cycle time. For example, assuming a 250 MHz clock, a four nanosecond delay per node, four clock periods for the arbitration and four nanosecond propagation delay to and from the tag assignor 117, then the go_now embodiment provides an improvement for an interconnect having about five or more nodes. This improvement becomes significant for eight or more nodes.

Figure 5:
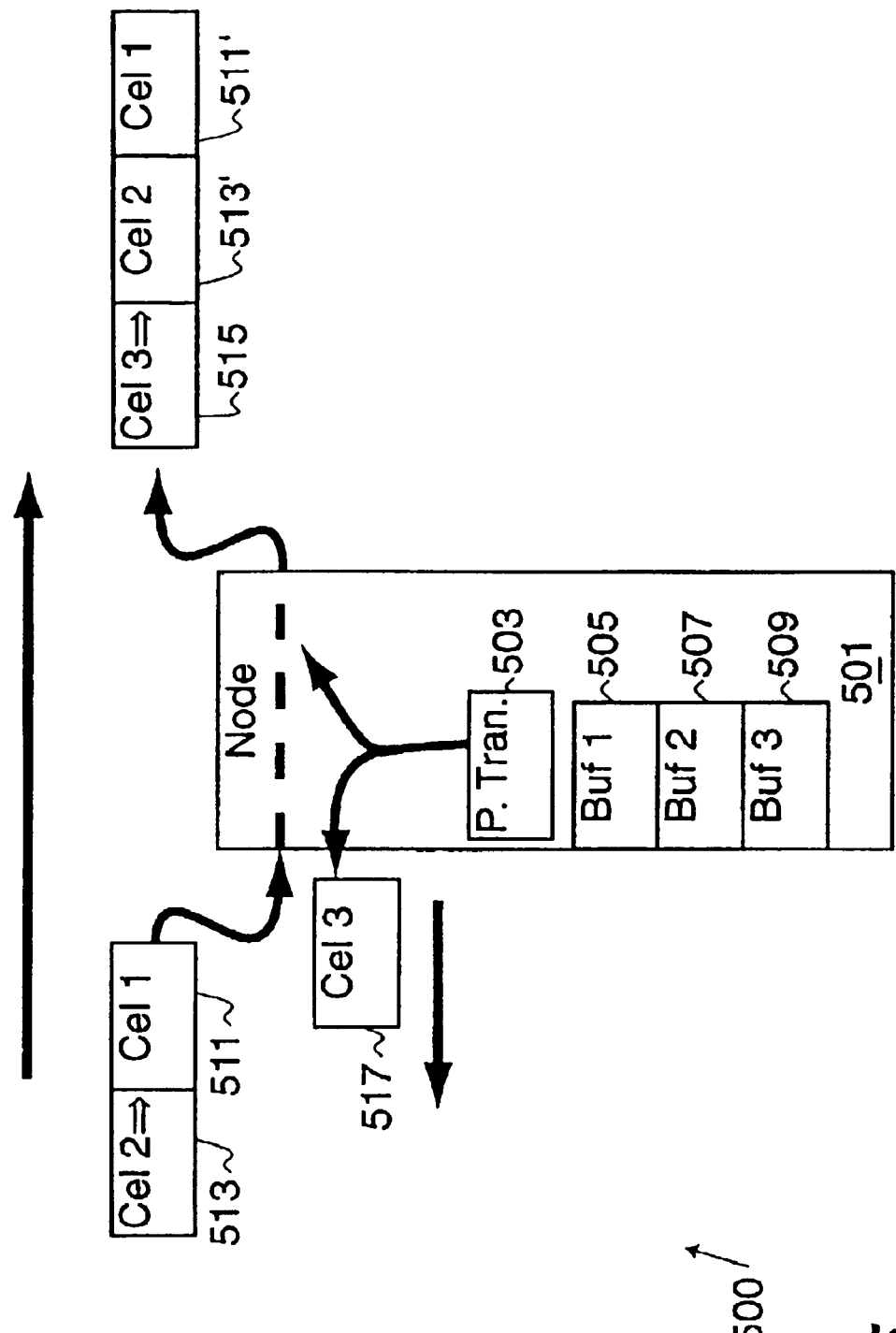
FIG. 5 illustrates an operational overview of cells flowing through a node in accordance with a preferred embodiment.
Figure 7:
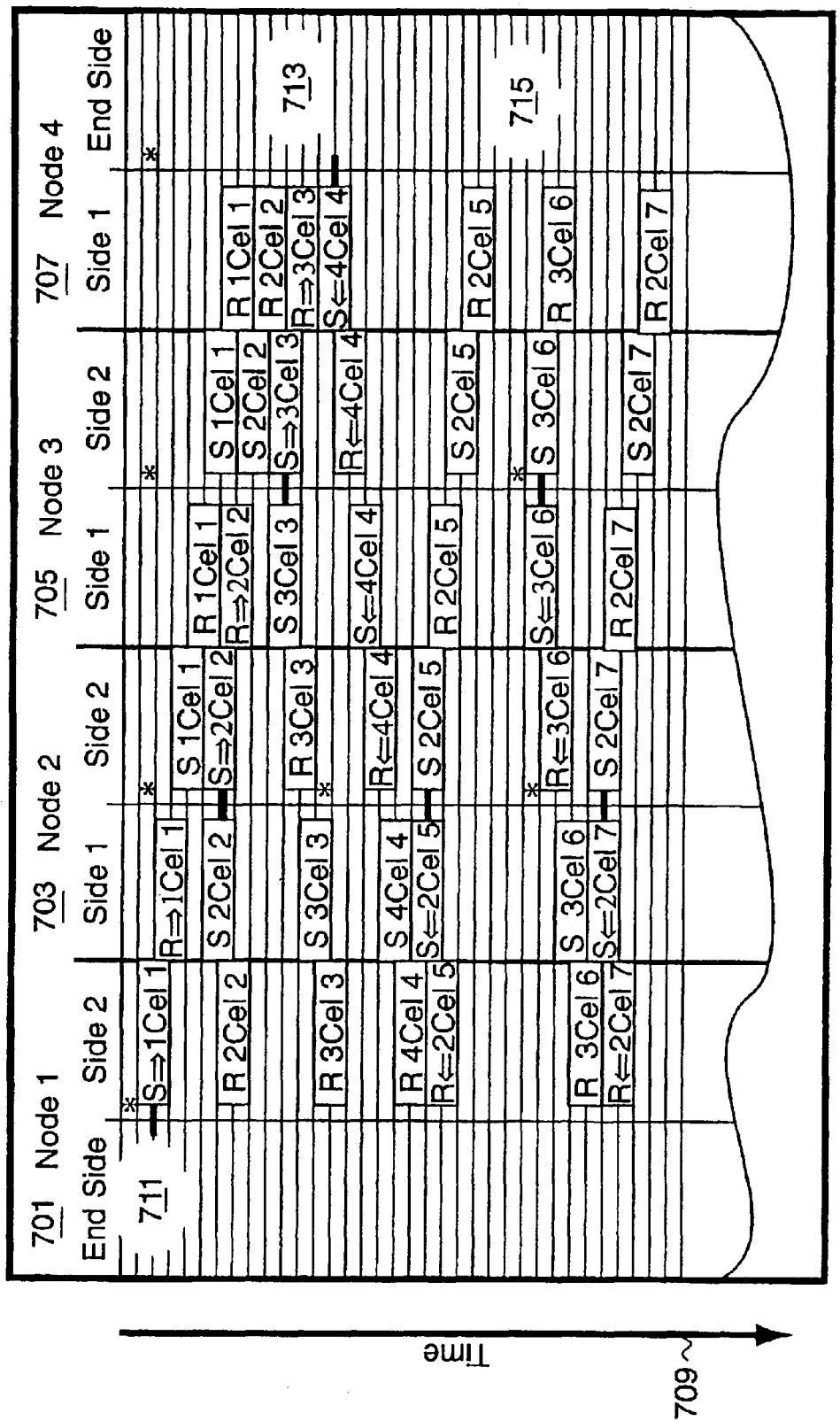
FIG. 7 illustrates cell traffic on the interconnect in accordance with a preferred embodiment.

FIG. 5 is an operational overview, indicated by general reference character 500, that illustrates how a node 501 receives cells from one side of the node 501 and regenerates the received cells onto the link at the other side of the node 501. The node 501 includes a pending transaction sub-action 503 that can be transmitted across the interconnect. The node 501 has already received a tag value from the tag assignor 117, but has not received the go_now signal as one or more transaction sub-actions are active on the interconnect. The node 501 also includes a first buffer 505, a second buffer 507, and a third buffer 509. Each of these buffers are associated with a particular pair of the set of three-party handshake signal line groups 113 as shown with respect to FIG. 1B (although FIG. 5 indicates that the set of three-party handshake signal line groups 113 are in direct communication with the buffers in a preferred embodiment, this association is through the bus interface 105). A first cell 511 is received by the node 501 from the first side of the node 501, and is regenerated (emitted) out the second side of the node 501 as a first cell 511' as the first cell 511 is being received. The contents of the first cell 511 is stored in the first buffer 505. The content of the first cell 511 and the first cell 511' are equivalent. Following the first cell 511 is a second cell 513 that is a granting cell (indicated by "⇒"). The content of the second cell 513 is stored in the second buffer 507. Because the node 501 has a tag value assigned by the tag assignor 117, the grant is removed from the second cell 513 as it is retransmitted out the second side of the node 501 as a second cell 513'. The second cell 513' does not include the grant. After the second cell 513 is received, the pending transaction sub-action 503 is transmitted out of both sides of the node 501. A granting cell 515, containing the pending transaction sub-action 503, is transmitted after the second cell 513' is retransmitted out the second side of the node 501. A non-granting cell 517 is transmitted out of the first side of the node 501 substantially simultaneously with the transmission of the granting cell 515. FIG. 7 illustrates the flow of cells across the interconnect.

Note that cells are copied into the local buffers at substantially the same time that they are emitted out the outgoing side of the interconnect. The cells need not go first into the local buffers and only then out the opposite side. One reason for the low propagation delay in the node is that the incoming cell is retransmitted as the incoming cell is received without needing to wait for the entire incoming cell to be received before starting retransmission.

FIG. 6 illustrates a cell handling process, indicated by general reference character 600, that illustrates how a cell is received and regenerated, and how the grant is processed as the cell is received. The cell handling process 600 initiates at a 'start' terminal 601 and continues to a 'receive word' step 603 that receives a word from one of the links. Once the word is received, a 'transaction sub-action received' decision step 605 determines whether the word is the last word of the cell (this is determined from the active* signal line 185). The received word is stored in the buffer specified by the tag value in the control word of the cell. If the cell has been completely received, a 'process transaction sub-action' step 607 performs whatever operations are required to process the transaction sub-action that is specified by the information in the cell. This may include manipulating one or more of the handshake signal lines, transferring data to or from a cache or memory, or other operations (common to data busses or otherwise). This manipulation of the handshake signal lines includes the possible assertion of the HIT* signal and the assertion of the DONE signal. Once the transaction sub-action is processed, the cell handling process 600 releases the DONE signal associated with the tag value at a 'release DONE' step 608, completes through an 'end' terminal 609 and awaits receipt of another word from one of the links.

The 'transaction sub-action received' decision step 605 is performed in parallel with a 'control word' decision step 611 that determines whether the received word is the control word 300 for the cell. If the received word is not a control word, the cell handling process 600 continues to an 'end node' decision step 613 that determines whether the node is an end node. If the node is an end node, the cell handling process 600 continues to a 'drop word' step 615 that swallows the word (essentially, if the node is an end node the cell is not regenerated onto the node's other link). The cell handling process 600 continues to the 'receive word' step 603.

However, if the 'end node' decision step 613 determines that the node is not an end node, the cell handling process 600 continues to an 'emit word' step 617 that emits the word onto the node's other link (thus, regenerating the word of the cell). The cell handling process 600 continues to the 'receive word' step 603. If the received word was the control word 300 at the 'control word' decision step 611, the cell handling process 600 continues to a 'grant determination' decision step 619 that examines the state of the 'next slot free [1]' field 319. If the 'next slot free [0]' field 319 is FALSE, the cell handling process 600 continues to the 'end node' decision step 613 and the cell handling process 600 continues as previously discussed.

However, if the 'next slot free [0]' field 319 is TRUE at the 'grant determination' decision step 619, the cell handling process 600 continues to a 'pending transaction sub-action' determination step 621 that determines whether the node has received a tag value from the tag assignor 117. If a tag value was not received, the grant is to be propagated so the cell handling process 600 continues to the 'end node' decision step 613 and the cell handling process 600 continues as previously discussed.

If a tag value was received at the time of the 'pending transaction sub-action' determination step 621, the cell handling process 600 continues to a 'clear grant' step 623 that sets the 'next slot free [0]' field 319 to FALSE and the cell handling process 600 continues as previously discussed. The grant will be set TRUE when the transaction sub-action associated with the tag value is emitted in the grant direction as has been previously described with respect to FIG. 4.

FIG. 7 illustrates a cell traffic chart, indicated by general reference character 700, that indicates how cells traverse the interconnect and how granting cells operate. The top of the chart 700 indicates the operations performed by a first node 701, a second node 703, a third node 705, and a fourth node 707. Each node has two sides (side 1 and side 2). The first node 701 and the fourth node 707 are end nodes in that the end side of these nodes need not be connected to the interconnect (in a preferred embodiment, the end nodes are a single node that does not propagate cells from one side of the node to the other side of the node). A time axis 709 indicates advancing time. The legend for the chart 700 is:

S/R: send/receive;

⇐: a granting cell traversing in the indicated grant direction;

xCel y: a cell that originated at node "x" and where "y" is the transaction sub-action sequence;

*: indicates receipt of a tag value.

The operation of the interconnect is perhaps best provided by an example. For this example, each of the nodes has a pending transaction sub-action and a tag value (as indicated by the "*"). The first node 701 was the first node to receive a transmit condition (for example, a go_now signal with its tag value). Thus at a location 711 the first node 701 transmits a granting cell (S⇒1Cel 1) to the second node 703. Because the first node 701 is an end node, no corresponding non-grant cell is emitted. Slightly after the first node 701 received it's tag value, the second node 703, the third node 705, and the fourth node 707 simultaneously receive tag values from the tag assignor 117 (indicated by "*"). The second node 703 receives the first word of (S⇒1Cel 1) at side 1 as (R⇒1Cel 1), removes the grant because the second node 703 has a pending transaction sub-action and starts emitting the cell out of side 2 (S 1Cel 1). Some or all of the contents of the incoming cell are stored in the second node 703 dependent on the tag value of the transaction sub-action (R⇒1Cel 1). After the cell ((S 1Cel 1) without the grant) has been emitted from side 2 onto the link to the third node 705, the second node 703 emits its pending transaction sub-action (S⇒2Cel 2). At substantially the same time as the pending transaction sub-action (S⇒2Cel 2) is being emitted onto the link to the second node 703 it is also emitted from side 1 of the second node 703 onto the link to side 2 of the first node 701 (as (S 2Cel 2) without the grant). The first node 701 receives (R 2Cel 2), swallows the cell, and stores some or all of the content of (R 2Cel 2) dependent on the tag value of the cell.

The third node 705 receives (R 1Cel 1)(R=2Cel 2) and starts regeneration of (S 1Cel 1) to the fourth node 707. At the same time, some or all of the contents of (R 1 Cel 1)(R⇒2Cel 2) are stored in the third node 705 dependent on the tag values in (R 1Cel 1)(R⇒2Cel 2). Because the third node 705 also has one or more pending transaction sub-actions, the (R⇒2Cel 2) is converted to (S 2Cel 2) by removing the grant as it is regenerated. After (S 2Cel 2) is emitted, the pending transaction sub-action is emitted. (S⇒3Cel 3) is emitted in the grant direction to the fourth node 707, and (S 3Cel 3) is emitted in the non-grant direction to the second node 703. (S 3Cel 3) propagates in turn to the second node 703 and to the first node 701. Each node saves some or all of the contents of the transaction sub-actions dependent on the tag values of the cell. The first node 701 and the fourth node 707 swallow any cells they receive (thus removing the cells from the interconnect). The fourth node 707 receives (R 1 Cel 1)(R 2Cel 2)(R⇒3Cel 3). Because the fourth node 707 is an end node these cells are swallowed and not retransmitted.

However at a location 713, because the fourth node 707 contains a pending transaction sub-action, the fourth node 707 emits a granting cell (S⇐4Cel 4) back to the third node 705. (Note, even if the fourth node 707 did not have a pending transaction sub-action, it could have generated a granting cell (S⇐) without any transaction sub-action data so as to continue the propagation of the grant). The third node 705 does not have a pending transaction sub-action and so receives (R=4Cel 4), regenerates (S⇐4Cel 4) to the second node 703 and captures (4Cel 4). The second node 703 has a pending transaction sub-action and so removes the grant from (R⇐4Cel 4) and emits (S 4Cel 4)(S⇐2Cel 5) over the link to the first node 701 as (R 4Cel 4)(R⇐2Cel 5). The second node 703 also emits (S 2 Cel 5) over the link to the third node 705 where it is regenerated to the fourth node 707.

In one preferred embodiment, a grant continues to reflect from one end of the interconnect to the other. Another preferred embodiment uses the go_now signal to initiate a grant on an idle interconnect. This operation is subsequently described.

Because no node has a current tag value, the interconnect is quiescent for a period of time (at a location 715 except for possible training cells to keep the signal delays trained). Eventually, the third node 705 receives a tag value followed shortly by the second node 703 receiving a tag value. Because the tag assignor 117 knew that all tag values were free prior to assigning a tag value to the third node 705, the tag assignor 117 also provided the go_now signal to the third node 705 (and because one tag value was in use, did not provide the go_now signal to the second node 703). Thus, the third node 705 emits (S⇐3Cel 6) and (S 3Cel 6) onto both links (thus, down each side of the interconnect). The third node 705 can be configured to randomly select which direction to emit an originated granting cell, can be configured to select a direction to emit the originated granting cell, or can be configured to adaptively select a direction based on the distribution of transaction sub-actions on the interconnect. In this example, the third node 705 emitted (S⇐3Cel 6) toward the second node 703 and (S 3Cel 6) to the fourth node. The second node 703 has received a tag value and thus emits (S 3Cel 6)(S⇐2Cel 7) toward the first node 701 and (S 2Cel 7) toward the third node 705. Each cell propagates across the interconnect as previously described.

Each node can be assigned multiple tag values. In this case, once the node receives a granting cell, the grant is removed, the cell propagated, and the pending transaction sub-actions encapsulated within cells that are concatenated with the previously granting cell. The last of these cells that are emitted in the granting direction contains the grant. Thus a node "q" could receive (R⇐rCel n) and transmit:

(S rCel n)(S qCel n+1)(S qCel n+2)(S qCel n+3)(S⇐qCel n+4).

Another preferred embodiment includes a distributed version of the tag assignor 117. This embodiment allows each node to control its own tags (and associated buffers and handshake signal lines). Thus, the node need not wait to receive a tag value from the tag assignor 117. So long as each node only uses its own tags (thus tags need not be shared), the tag assignor 117 reduces to a go_now mechanism. In this embodiment, if there are more nodes than tags, the go_now capability is disabled. The grant can be propagated by continuously bouncing a granting cell from one end node to the other end node.

Training cells are sent from a specified end node if the end node has not received a cell for a specified period of time. The training cell is a simple grant (S⇐) or (S⇒). Because each line of the first two words of the cell (the control word 201 and the inverted control word 203) are complemented, the cell includes enough signal line transitions for the bus repeater 103 to stay trained using techniques similar to those explained in the parent application.

Bus Repeater

Figure 8:
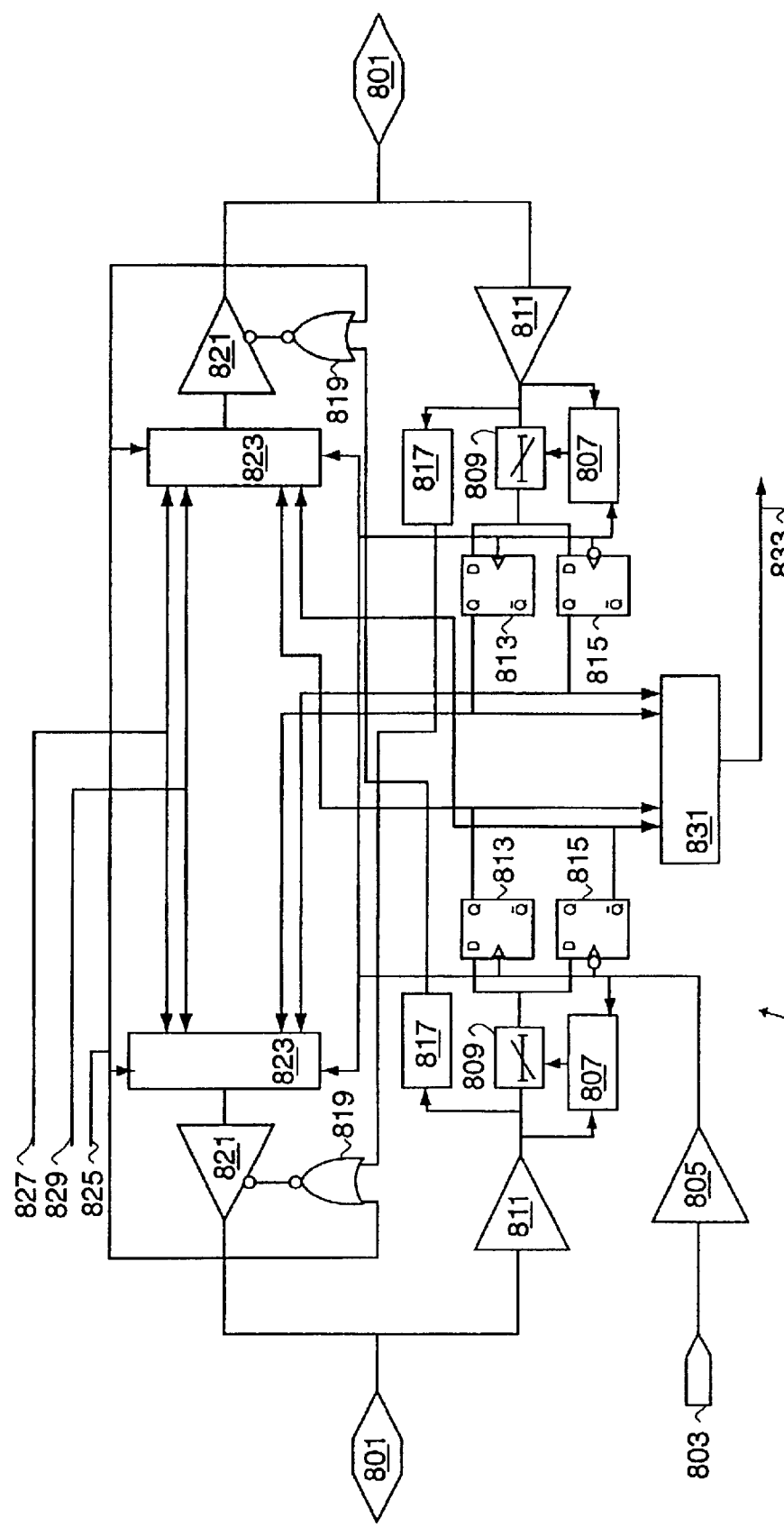
FIG. 8 illustrates a high-speed bus repeater in accordance with a preferred embodiment.

FIG. 8 illustrates a 'bus repeater', indicated by general reference character 800, is used to regenerate and deskew data arriving at a 'bi-directional link terminal' 801. The 'bus repeater' 800 receives it clock signal at a 'bi-phase clock terminal' 803. The clock signal can be generated using the previously described techniques. In a preferred embodiment, the clock signal is generated internal to the node and dependent on a frequency reference signal. A 'clock isolation' circuit 805 receives the clock signal and isolates the clock signal from the subsequently described circuits. A 'delay line control' circuit 807 uses techniques described in the parent application to adjust a 'digital delay line' circuit 809 to deskew the incoming data signals. In a preferred embodiment, the 'digital delay line' circuit 809 provides a separate delay for each signal that arrives at the 'bi-directional link terminal' 801. Other embodiments may provide a single delay for each incoming data signal.

The 'bus signal isolation' circuit 811 receives and isolates the data signals from the 'bi-directional link terminal' 801. These signals are delayed by the 'digital delay line' circuit 809 to be in synchronization with clock from the 'clock isolation' circuit 805. The 'delay line control' circuit 807 and the 'digital delay line' circuit 809 are trained by a process subsequently described with respect to FIG. 10. A 'rising edge D flip-flop' circuit 813 and a 'falling edge D flip-flop' circuit 815 for each incoming delayed data signal clock the state of the signal on the rising and falling edges of the clock signal respectively. This generates dual data pipelines as is described in the parent application.

A 'cell detection' circuit 817 monitors the incoming active* data line and enables an 'output enable' circuit 819 when a cell is being received from either of the links attached to the 'bus repeater' 800. Thus, the 'bus repeater' 800 is auto-directional. The 'output enable' circuit 819 drives a 'link output driver' circuit 821 that emits data signals onto the 'bi-directional link terminal' 801 on each edge of the clock signal. Data to be emitted is multiplexed through an 'output data multiplexer' circuit 823. A 'send signal' line 825 also feeds the 'output enable' circuit 819 and is activated when data from the node is to be emitted from the 'bus repeater' 800. The 'output data multiplexer' circuit 823 multiplexes the pipelined data from the 'rising edge D flipflop' circuit 813 and the 'falling edge D flip-flop' circuit 815 when a cell is being regenerated. Thus, the 'bus repeater' 800 regenerates the cell being received on one link onto the other link while the cell is being received. The 'output data multiplexer' circuit 823 also multiplexes a 'pending transaction sub-action data [63:32]' bus 827 and a 'pending transaction sub-action data [31:0]' bus 829 to emit node data when the 'send signal' line 825 is active. A 'received data multiplexer' circuit 831 assembles the data clocked into the 'rising edge D flip-flop' circuit 813 and the 'falling edge D flip-flop' circuit 815 and places the data on a 'received data' bus 833 where it can be stored in a buffer using appropriate circuits (not shown).

Snooping Cache Protocol Details

Multiprocessor systems impose strict ordering requirements upon transaction sub-actions by the various nodes in the system. These ordering requirements limit the amount of concurrent processing available to maximize performance. When the invention is used with snooping cache protocols it enables concurrent snoops on multiple addresses in different cache lines.

In a preferred embodiment, the transaction sub-action originator follows ordering rules to determine when its instant transaction sub-action is allowed to complete relative to other transaction sub-actions that are pending at the time at the time of the instant transaction sub-action.

Figure 9A:
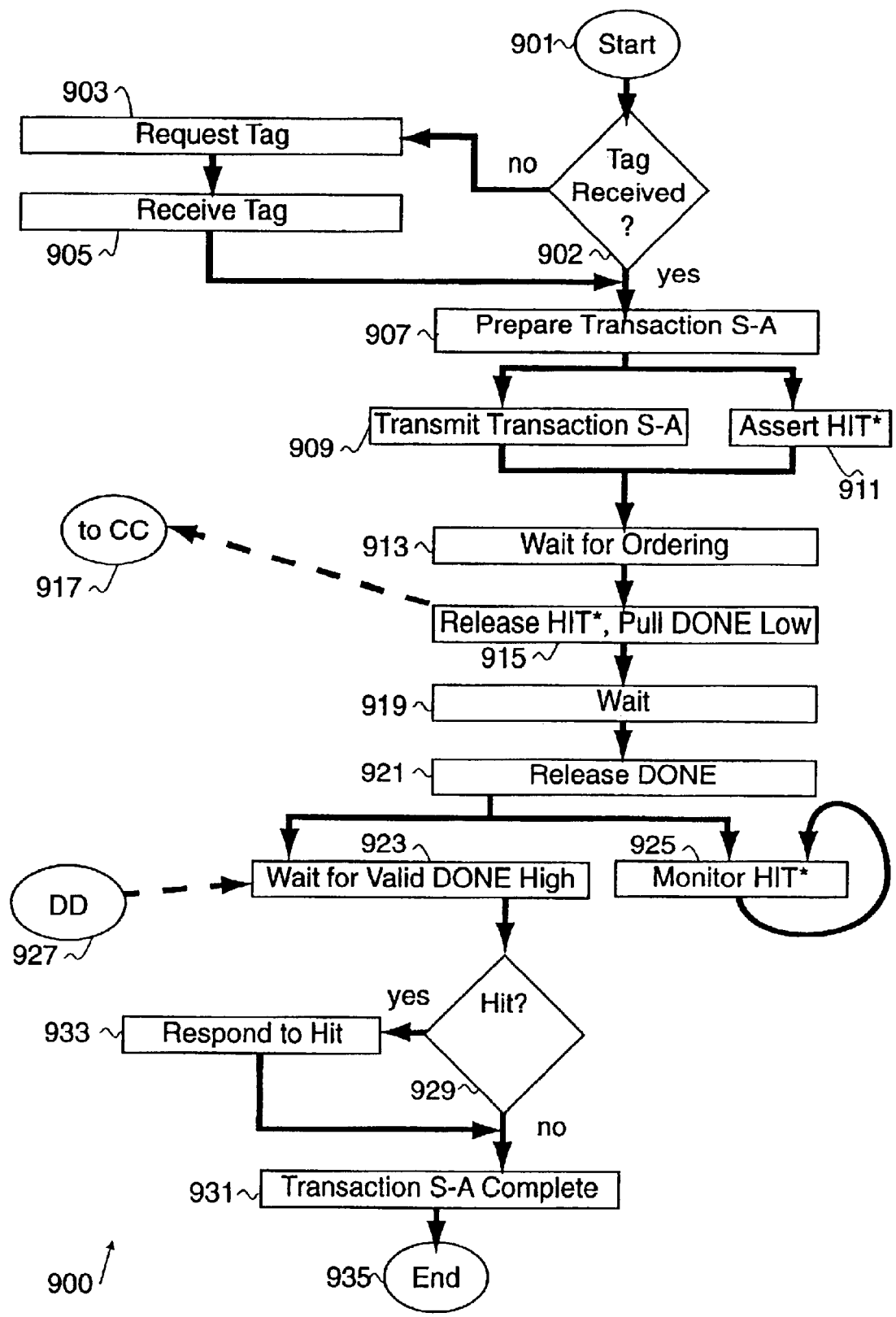
FIG. 9A illustrates a snoopy cache transaction (originator side) process used in accordance with a preferred embodiment.

FIG. 9A illustrates a cache transaction (originator side) process, indicated by general reference character 900, that details the transaction sub-actions for a cache operation performed by the originating node using snooping cache protocols. The process 900 initiates at a 'start' terminal 901 responsive to a memory access and continues to a 'tag ready' decision step 902. If a tag value has not been received by the node, the process 900 continues to a 'request tag' step 903. The 'request tag' step 903 requests a tag value from the tag assignor 117. A 'receive tag' step 905 receives the tag value from the tag assignor 117. If the 'tag ready' decision step 902 determines that the node has already received a tag value, or once the tag value is received at the 'receive tag' step 905, the process 900 uses the memory buffer associated with the tag value to prepare the instant transaction sub-action at a 'prepare transaction sub-action' step 907. The instant transaction sub-action is transmitted (per the granting mechanisms described with respect to FIG. 7) by a 'transmit transaction sub-action' step 909 at substantially the same time as an 'assert HIT*' step 911 asserts the HIT* signal (by pulling the HIT* handshake signal line down) associated with the tag value. A 'wait for ordering' step 913 then performs transaction sub-action ordering evaluation. The 'wait for ordering' step 913 determines which in-progress transaction sub-actions are order dependent as to the instant transaction sub-action. When concurrent processing can be performed on the instant transaction sub-action, the process 900 continues to a 'start transaction sub-action processing' step 915. The 'start transaction sub-action processing' step 915 substantially simultaneously releases the HIT* signal and pulls the DONE signal associated with the tag value of the instant transaction sub-action. At this point, other nodes on the interconnect can start processing the instant transaction sub-action through a 'to CC' terminal 917 as is subsequently described with respect to FIG. 9B. The process 900 continues to a 'wait' step 919 that provides sufficient delay to assure that all the nodes have driven their DONE signal low for the corresponding tag value. After this delay, the originator node releases the appropriate DONE signal at a 'release DONE' step 921. The DONE signal usually will not rise at this time because one of the other nodes will be pulling the DONE signal low. Next, the process 900 continues to a 'wait for DONE' step 923 and a 'monitor HIT*' step 925. The 'wait for DONE' step 923 waits for a valid DONE signal (each node processing the instant transaction sub-action eventually releases the DONE signal as indicated by a 'DD' terminal 927). While waiting, the 'monitor HIT*' step 925 monitors the state of the HIT* signal such that its state will be captured just prior to the valid DONE signal.

Once the 'wait for DONE' step 923 completes in response to a valid DONE signal, the process 900 continues to a 'HIT' decision step 929 that examines the state of the HIT* signal as monitored by the 'monitor HIT*' step 925 to determine whether the snoop operation of one of the node detected a hit. If no hit was detected, the process 900 continues to a 'transaction sub-action complete' step 931 that performs end-of-transaction sub-action cleanup. Once both the HIT* and DONE signals arm high, the transaction sub-action is complete and the tag assignor 117 can reuse the tag value. However, if the 'HIT' decision step 929 detected a hit, the process 900 continues to a 'respond to HIT' step 933 that can condition the node to perform other transaction sub-actions if required (for example, invalidating a cache line in the other nodes). Regardless, the instant transaction sub-action completes and the process 900 itself completes through an 'end' terminal 935.

A valid DONE signal is one that has remained high for at least equal to twice the propagation delay of the DONE signal line.

The 'wait for ordering' step 913 notes which of the node's buffers include active transaction sub-actions at the time the instant transaction sub-action is transmitted. The preexisting transaction sub-actions that are of a type and address for which ordering are significant, as compared to the instant transaction sub-action, are noted. These preexisting transaction sub-actions (that must be completed before the instant transaction sub-action is completed), include those for which cells arrived in the burst containing its granting transaction sub-action, as well as those whose HIT* or DONE signals are low at the time the instant transaction sub-action is transmitted. The originator node of the instant transaction sub-action examines these preexisting transaction sub-actions and determines which must complete before its own transaction sub-action may proceed to the snoop phase or be allowed to complete. The originator node makes this determination from the address and control words in its active transaction sub-action buffers. In particular, each node includes a comparator mechanism to monitor and compare the address contained in its instant transaction sub-action and each active transaction sub-action in its set of transaction sub-action buffers. Thus, the originator node forces the other nodes to wait to process the transaction sub-action until the prior order-dependent transaction sub-actions have completed.

Figure 9B:
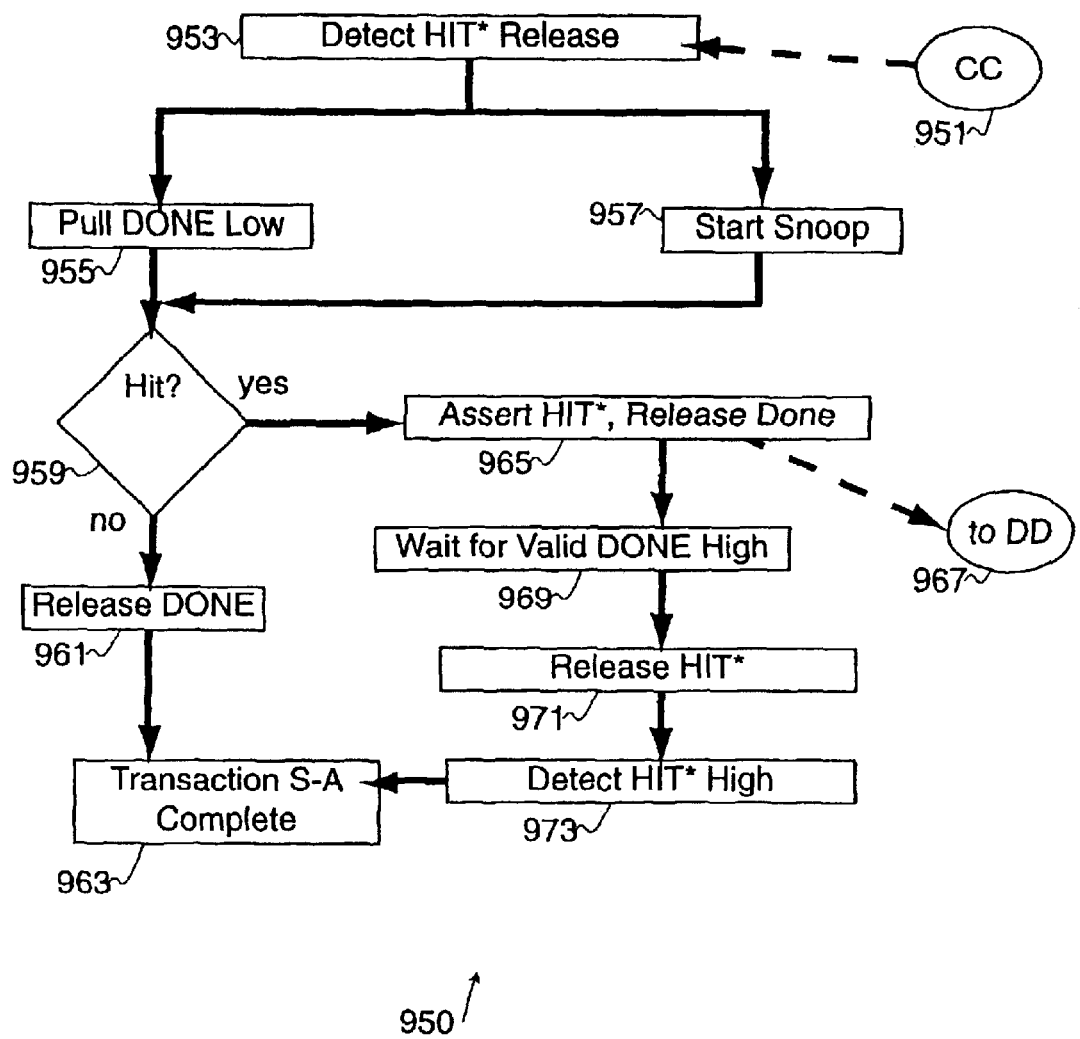
FIG. 9B illustrates a snoopy cache transaction (receiver side) process used in accordance with a preferred embodiment.

FIG. 9B illustrates a cache transaction (receiver side) process, indicated by general reference character 950, using snooping cache protocols and that is initiated by the process 900 of FIG. 9A through the 'to CC' terminal 917. At this point, the originator node has released the HIT* signal and has pulled the DONE signal low (both the HIT* and DONE being associated with the tag value for the instant transaction sub-action). The receiver node has already received the transaction sub-action and has stored it in its buffer (identified by the tag value). The receiver side process starts through a 'CC' terminal 951 and continues to a 'detect HIT* release' step 953 that detects when the HIT* signal associated with the tag value rises (in response to the release of the HIT* signal by the 'start transaction sub-action processing' step 915 of FIG. 9A). The process 950 substantially simultaneously pulls the DONE signal low at a 'pull DONE low' step 955 and starts the snoop operation at a 'start snoop operation' step 957. A 'hit' decision step 959 determines whether the snoop operation detected a hit in a cache line. If no hit was detected by the snoop operation, the process 950 continues to a 'release DONE' step 961 that releases the DONE signal. At this point, the transaction sub-action is complete as shown by a 'transaction sub-action complete' step 963 and the node has completed processing the transaction sub-action. However, if the 'hit' decision step 959 determines that the snoop operation detected a hit, the process 950 continues to an 'indicate hit' step 965 that substantially simultaneously releases the DONE signal and asserts the HIT* signal (both associated with the tag value). The release of the DONE signal is communicated to the originator node as indicated by a 'to DD' terminal 967 (other nodes can also monitor the HIT* signal to detect that a hit has occurred). Now the process 950 continues to a 'wait for valid DONE high' step 969 that causes the node to wait for a valid DONE signal (that is, all the other nodes including the originator node have released the DONE signal for a sufficient amount of time). Next, the process 950 continues to a 'release HIT*' step 971 that releases the HIT* signal. Once the HIT* signal is released by all the nodes and has propagated the interconnect, the process 950 continues to a 'detect HIT* high' step 973 and completes at the 'transaction sub-action complete' step 963.

TABLE 1

| Phase or Event | HIT* | DONE | |
|---|---|---|---|
| Idle buffer | H | H | Reached at end of transaction sub-action, maintained while buffer is idle |
| Wait for ordering | L | H | Originator drives HIT* low until snoop ordering requirements are met. |
| Snoop phase | H | L | HIT* released by originator, DONE driven low by all nodes when HIT* is detected high. |
| Snoop response | H or L | released | State of HIT* prior to rise of DONE is result of snoop. DONE is released by snooping nodes upon completion of snoop. DONE is released by originator upon satisfaction of all ordering requirements. |
| End | H | H | Responding node(s) release HIT* on detecting DONE high. |

The meaning of the HIT* and DONE signals are summarized in Table 1.

As each node releases DONE it is possible for other nodes to detect a rising glitch on DONE, even though some other node is still driving it low. The length of this glitch is related to the propagation delay of the DONE signal trace. To prevent erroneous operation, nodes must not detect DONE high until it has been high continuously for a period at least equal to twice the propagation delay of the DONE trace. A DONE that has remained continuously high for such a period is a valid DONE. This requirement applies only to rising edges. Therefore, a node may assert HIT* and release DONE simultaneously and still be assured that other nodes will detect its HIT* assertion reliably.

If an originator has received a GO_NOW signal from the tag assignor, it knows that no transaction sub-actions have precedence over it. In this case it moves directly to the snoop phase by releasing DONE a chain propagation delay after emitting its cell onto the interconnect.

Figure 10:
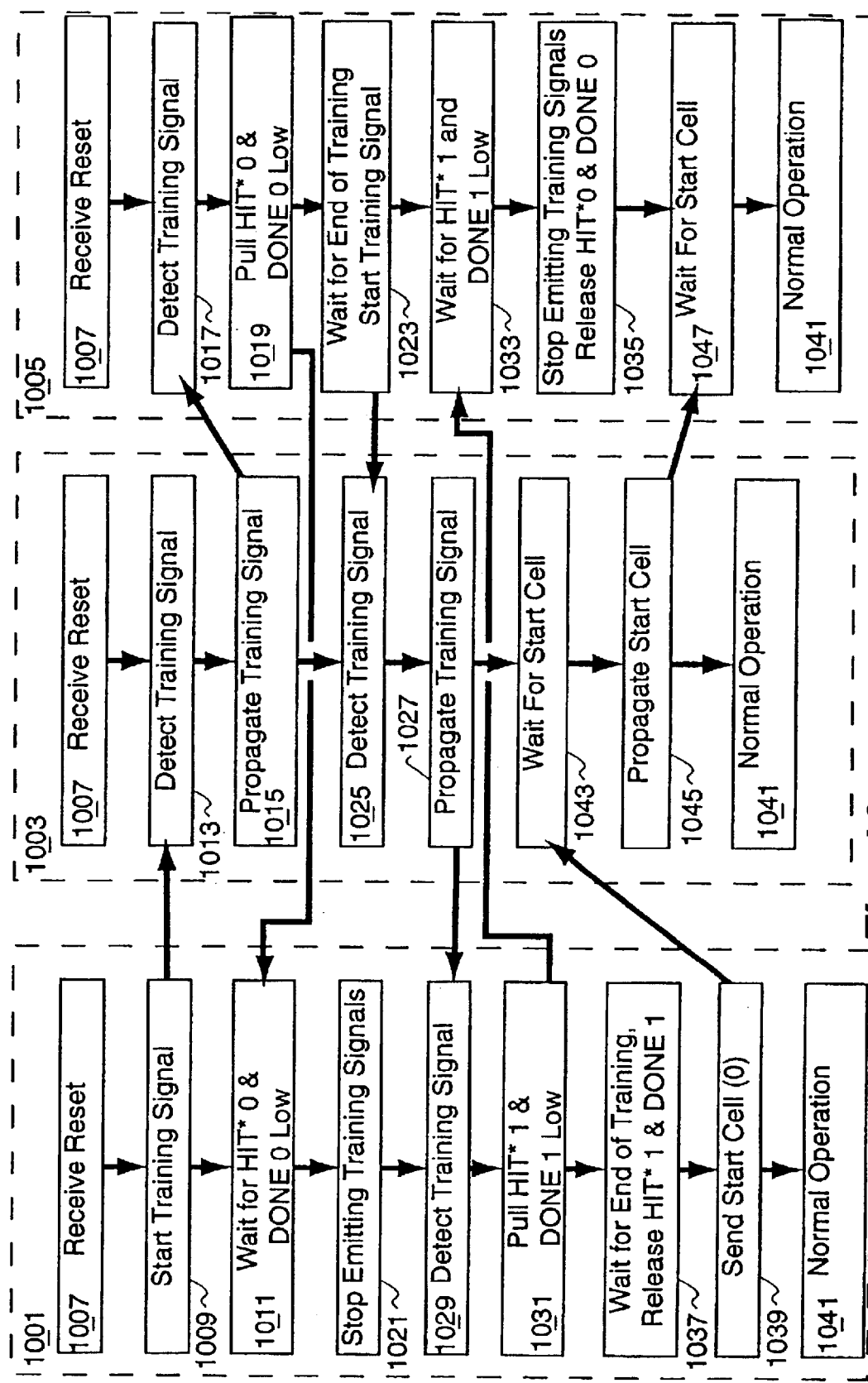
FIG. 10 illustrates an interconnect initialization process in accordance with a preferred embodiment.

The interconnect can be initialized as shown in FIG. 10. The interconnect has a first end node, a second end node and usually one or more intermediate nodes. Each of these nodes perform a specific node initialization process. The first end node performs a 'first end node initialization' process 1001, all the intermediate nodes perform an 'intermediate node initialization' process 1003, and the second end node performs the 'second end node initialization' process 1005.

Initialization consists of the first end node sending training signals toward the second end node until the second end node is trained at which point the first end node stops sending training signals. The training signals are generated substantially as described with reference to FIG. 5b of the parent application. The second end node then sends training signals to the first end node until the first end node is trained. Once the first end node is trained it sends a start cell that causes the other nodes to enter normal operation (as has been previously described).

Looking now at the initialization process in detail. A 'receive reset' step 1007 resets the all the nodes in the interconnect. The designated first end node then starts sending training signals toward the second end node at a 'start emitting training signal' step 1009. While the training signals are being emitted the first end node waits for a response from the second end node at a 'wait for HIT* (0) and DONE (0) low' step 1011. As this node is an end node, the training signals are sent to the only adjacent node. At the adjacent node, a 'detect training signal' step 1013 detects the training signal (using edge detection techniques related to those described in FIGS. 4, 5 and 6 of the parent application). Upon detecting the training signal, the node adjusts its DLLs until the outputs of their delay lines are synchronized to its internal clock (e.g. trained) Once the intermediate node's DLLs are trained, the intermediate node propagates the training signal at a 'propagate training signal' step 1015 to the next adjacent node.

If the next adjacent node is another intermediate node it also detects and propagates the training signal. Eventually, the second end node detects the training signal at a 'detect training signal' step 1017. Once the second end node detects the training signal an 'indicate second end node trained' step 1019 indicates to the first end node that the second end node (thus all the intermediate nodes) is trained in a first direction. The 'indicate second end node trained' step 1019 pulls down the HIT* (0) and DONE (0) handshake lines. The first node detects that the HIT* (0) and DONE (0) lines are low at the 'wait for HIT* (0) and DONE (0) low' step 1011. Once the first end node has detected that the second end node has been trained, the 'first end node initialization' process 1001 continues to a 'stop emitting training signal' step 1021 that stops emission of training signals from the first end node. The last emitted training signal propagates to the second end node. Once the second end node detects that the interconnect has gone quiescent, a 'start emitting training signal' step 1023 continuously emits training signals back along the bi-directional link. The first intermediate node detects the training signal at a 'detect training signal' step 1025, trains its DLLs, and propagates the training signal toward the fist end node at a 'propagate training signal' step 1027. Eventually the training signals propagate to the first end node. At this point the 'first end node initialization' process 1001 continues at a 'detect training signal' step 1029 that detects the training signal and trains its DLLs. At this point, all the bi-directional links have been trained in both directions. Next, an 'indicate first end node trained' step 1031 of the 'first end node initialization' process 1001 indicates to the second end node that the first end-node is now trained by pulling down HIT* (1) and DONE (1). The 'second end node initialization' process 1005 detects the low HIT* (1) and DONE (1) at a 'wait for HIT* (1) and DONE (1) low' step 1033 and continues to a 'stop emitting training signal' step 1035 that stops the emission of training signals from the second end node and releases HIT* (0) and DONE (0). The first end node then waits for the end of the training signals at a 'detect end-of-training' step 1037 that also releases HIT* (1) and DONE (1). The 'first end node initialization' process 1001 then emits a start cell at a 'send start cell (0)' step 1039 and enters normal operation at a 'normal operation' state 1041. The start cell is received by an intermediate node at a 'wait for start cell (0)' step 1043. Once received, the start cell is propagated to the next node at a 'propagate start cell (0)' step 1045 and the intermediate node enters the 'normal operation' state 1041. Eventually, the start cell is propagated to the second end node where it is received by a 'wait for start cell (0)' step 1047 of the 'second end node initialization' process 1005. At this point, the second end node enters the 'normal operation' state 1041 and the entire interconnect is ready for normal operation. One skilled in the art will understand that some delays to account for signal and cell propagation are included within some of these steps if appropriate.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof. One skilled in the art will understand that the invention allows the implementation of very high performance cache coherent multiprocessing systems.

From the foregoing, it will be appreciated that the invention has (without limitation) the following advantages:

1) The ability to implement well known backplane bus protocols over an interconnect comprised of point to point links resulting in much higher bandwidth, the possibility of supporting large numbers of nodes at low cost, and the ability to distribute the nodes over greater distances than possible with conventional backplane busses.

2) The invention provides a simple and elegant mechanism for extending cache coherency on a multi-processor computer system over larger distances and a greater number of cache-agents than possible with a bussed interconnect.

3) The invention provides a simple and elegant mechanism that allows the removal of ordering requirements when addresses are indeed in different cache lines.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A method for broadcasting information among interconnected nodes, including the steps of:

receiving a packet at a first node from a second node, the packet containing at least a transaction sub-action;

retransmitting the packet from the first node, wherein retransmitting of the packet is performed at least in part while as the packet is being received by the first node; and capturing the sub-action at the first node as the packet is being retransmitted; and maniplulating handshake lines between the first node and at least one other node in response to the sub-action.

2. A method as in claim 1, wherein the sub-action is a memory read request.

3. A method as in claim 1, wherein the sub-action is a memory read response.

4. A method as in claim 1, wherein the sub-action is an invalidation.

5. A method as in claim 1, wherein the step of manipulating handshake lines further comprises setting each of the handshake lines with a tag value.

6. A method as in claim 5, wherein the tag value for each of the handshake lines is associated with a buffer in the first node.

7. A method as in claim 1, wherein each of the handshake lines includes a HIT* tag line and a DONE tag line.

8. A node interconnected to other nodes, comprising:

an interface to a link to a second node across which said node receives a packet containing at least a transaction sub-action;

a repeater that retransmits the packet from the node while at least a portion of the packet is being received at the interface;

an interface to handshake lines between the node and the other nodes; and a memory and cache agent that captures the sub-action as the packet is being retransmitted and that manipulates that handshake lines in response to the sub-action.

9. A node as in claim 8, wherein the sub-action is a memory read request.

10. A node as in claim 8, wherein the sub-action is a memory read response.

11. A node as in claim 8, wherein the sub-action is an invalidation.

12. A node as in claim 8, wherein the cache agent manipulates the handshake lines by setting each of the handshake lines with a tag value.

13. A node as in claim 12, wherein the memory of the memory and cache agent includes plural buffers, and wherein the tag values for the handshake lines are associated with the plural buffers.

14. A node as in claim 8, wherein each of the handshake lines includes a HIT* tag line and a DONE tag line.

* * * * *